(No Model.)

M. HOUSMAN.
PROCESS OF ORNAMENTING PLASTIC MATERIALS.

No. 455,666. Patented July 7, 1891.

WITNESSES:
William Keller
Edward Wolff

INVENTOR:
Moses Housman.
BY
Van Santvoord & Hauff
ATTORNEYS

UNITED STATES PATENT OFFICE.

MOSES HOUSMAN, OF BROOKLYN, NEW YORK.

PROCESS OF ORNAMENTING PLASTIC MATERIALS.

SPECIFICATION forming part of Letters Patent No. 455,666, dated July 7, 1891.

Application filed April 20, 1891. Serial No. 389,616. (No model.)

*To all whom it may concern:*

Be it known that I, MOSES HOUSMAN, a citizen of the United States, residing at Brooklyn, in the county of Kings and State of New York, have invented new and useful Improvements in Processes of Ornamenting or Pressing Paper, Leather, and other Plastic Materials, of which the following is a specification.

This invention relates to a process of ornamenting or pressing pasteboard, (particularly such as is generally used for signs and book-covers,) paper, leather, and other plastic materials—such, for example, as wood, textile material, rubber, celluloid, or the like; and the object of the invention is to decorate such plastic material with gold, silver, or other metal leaf, as set forth in the following specification and claim and illustrated in the annexed drawings, in which—

Figure 1:
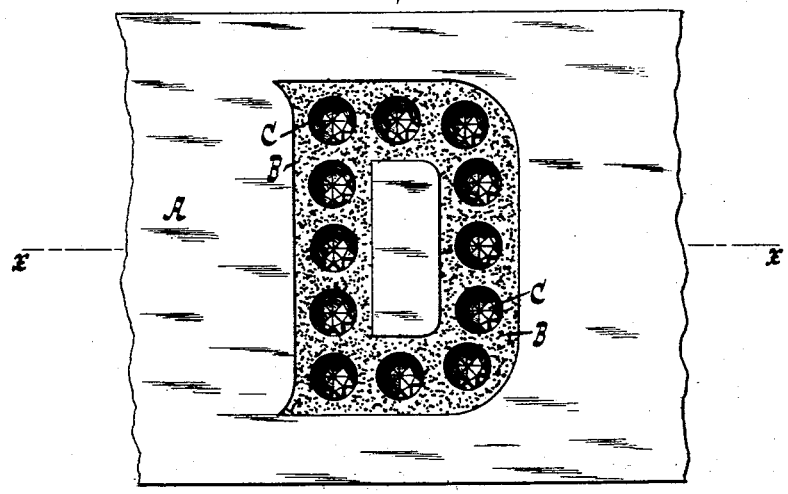
Figure 2:
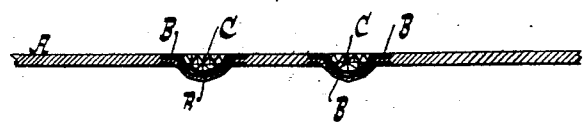
Figure 3:
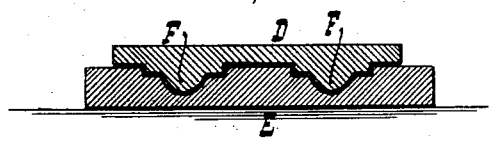
Figure 4:
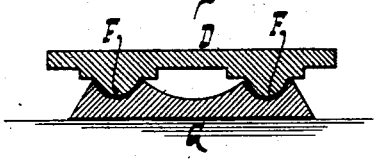

Figure 1 is a plan view of a piece of plastic material decorated according to my invention. Fig. 2 is a section along *x x*, Fig. 1. Fig. 3 is a sectional view of dies used at one step of the process. Fig. 4 is a similar view of dies used at another step of the process.

The process consists in taking a base A of the required material—such as a piece of pasteboard—and providing said base with an adhesive, such as glue, shellac, gelatine, or the like. The metallic leaf B is then placed over the adhesive, and the whole is exposed to pressure between heated dies, so as to cause the metal leaf to adhere to the base at the required spots, and at the same time to form depressions or sockets C in the leaf and in the base. The male die D and female die E used in the above pressing operation are shown in Fig. 3, the die D having suitable projections F entering suitable recesses in die E, so as to produce the sockets C. After the article has been pressed by the dies D E said article is removed from the dies, and the sockets C are then provided or dusted with an adhesive, such as powdered shellac or gum. A second layer or supply of metal leaf is then placed over the first layer, and the parts of the leaf at the sockets C only are exposed to pressure in the heated dies D G. The result of such second pressure is that a double layer of metal leaf is applied in the sockets, and as the entire pressure is now applied only at the sockets the metal leaf in said sockets will be pressed very smooth, so as to assume a brilliant or glassy appearance. The brilliant appearance in the sockets is also insured by having the projections F of the die D provided with smooth faces or facets, and if the rest of the die D is made mottled or grained the sockets will be made to appear extremely brilliant by contrast. The projections F can be made of any shape or configuration. I have found satisfactory results to be obtained by providing the projections F with facets like a diamond. The die E is a counterpart of die D, while the die G is constructed to receive only the pressure of the projections F of die D, so that during the second pressing operation the metal leaf is exposed to pressure only at the sockets. The dies may be formed so as to press letters, numbers, or any other suitable designs or figures. By the above process there will be two layers B B of metal leaf in the sockets and only one layer at ornamented parts outside the sockets.

What I claim as new, and desire to secure by Letters Patent, is—

The process of ornamenting or pressing paper, leather, and other plastic material, which consists in taking a base of the required material, providing said base with an adhesive, placing metallic leaf on the adhesive, exposing the whole to pressure in the presence of heat, so as to cause the leaf to adhere to the base at the required portions and to form depressions or sockets in said leaf and base, providing the depressions or sockets with adhesive, applying a second supply of metallic leaf, and exposing the leaf at the sockets only to pressure in the presence of heat, substantially as described.

In testimony whereof I have hereunto set my hand in the presence of two subscribing witnesses.

MOSES HOUSMAN.

Witnesses:
WM. C. HAUFF,
E. F. KASTENHUBER.